United States Patent [19]

Pernat et al.

[11] Patent Number: 4,651,778
[45] Date of Patent: Mar. 24, 1987

[54] PRESSURE REGULATING SYSTEM

[76] Inventors: Alfred Pernat, 49 Headingly Road, Mount Waverley, Victoria, Australia, 3149; Thomas D. Millar, deceased, Hamilton, New Zealand; by June A. Millar, personal representative, 10 Menzies Place, Hamilton, New Zealand

[21] Appl. No.: 671,772

[22] Filed: Nov. 15, 1984

[51] Int. Cl.[4] ............................................. F16K 31/365
[52] U.S. Cl. ..................................... 137/489; 137/508; 137/512.2
[58] Field of Search ................. 137/DIG. 3, 508, 489, 137/512.2

[56] References Cited

U.S. PATENT DOCUMENTS

| | | | |
|---|---|---|---|
| 2,940,462 | 6/1960 | Johanson | 137/508 X |
| 3,020,926 | 2/1962 | Browning | 137/508 X |
| 3,749,121 | 7/1973 | Frankewich | 137/512.2 |
| 3,797,803 | 3/1974 | Goto | 137/907 X |
| 4,140,436 | 2/1979 | Schumacher | 137/508 X |

FOREIGN PATENT DOCUMENTS 1440901  6/1976  United Kingdom ......... 137/DIG. 8

*Primary Examiner*—Alan Cohan
*Attorney, Agent, or Firm*—Holman & Stern

[57] ABSTRACT

A pressure regulating system valve comprises a valve having a valve body with a control chamber and a regulated pressure chamber with a first diaphragm separating the two chambers, the first diaphragm being connected to a second diaphragm for movement therewith, and a valve member which co-acts with a valve seat to form a valving means between a pressure supply and the regulated pressure chamber. Movement of the diaphragms causes actuation of the valve seat to control pressure admitted from the pressure supply into the regulated pressure regulating chamber. In combination with the pressure regulating valve is a pressure relief valve which has a relief valve member exposed on one surface to the pressure in the regulated pressure chamber and on the opposite surface to atmospheric pressure and which has a spring to bias the relief valve member to a closed position so that an increased vacuum in the regulated pressure chamber moves the relief valve member to admit atmospheric air to the regulated pressure chamber. A safety valve operable in the event of excessively high vacuum is also provided. An auxiliary valve controlled by the vacuum control pressure in the central chamber which actuates the diaphragms.

7 Claims, 4 Drawing Figures

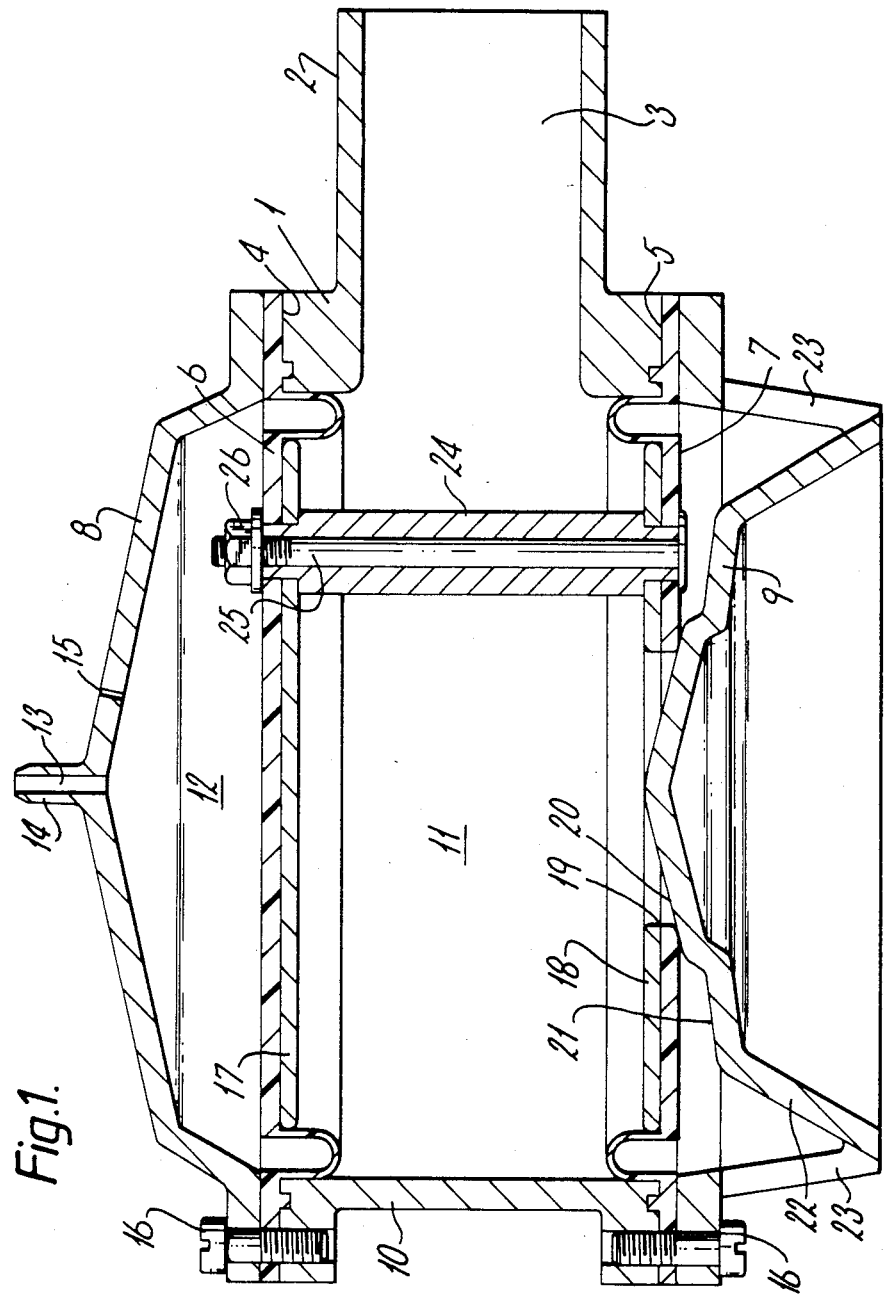

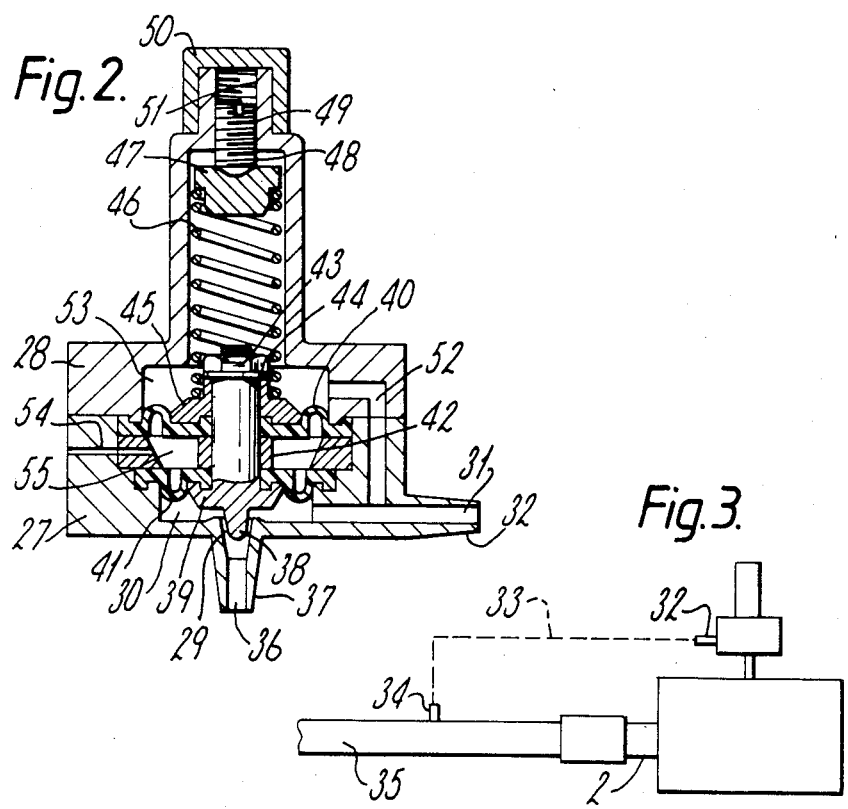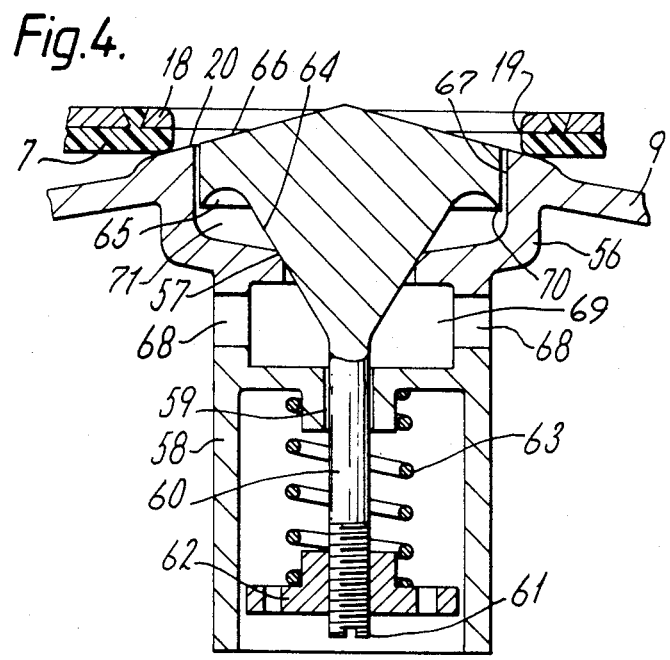

PRESSURE REGULATING SYSTEM

FIELD OF THE INVENTION

This invention relates to pressure regulating valves and has been devised particularly though not necessarily solely for use in regulating the pressure (vacuum) in milking machines.

BRIEF SUMMARY OF THE INVENTION

It is an object of the present invention to provide a pressure regulating valve for a milking machine.

In one aspect the invention consists in a pressure regulating valve comprising a valve body having a control chamber and a regulated pressure chamber therein;
 a first movable wall within said body separating said control chamber from said regulated pressure chamber;
 a second movable wall spaced from said first movable wall; means interconnecting said two movable walls such that movement of one results in movement of the other; and valving means operable upon movement of said second movable wall to control fluid admission from a pressure source into said regulated pressure chamber, the construction and arrangement being such that upon varying the pressure in the control chamber, the movable walls move thereby operating the valving means to control the admission of fluid from the pressure source to the regulated pressure chamber for the purposes of controlling the pressure in the pressure chamber.

In a further aspect the invention consists in a combination of the pressure regulating valve hereinbefore set forth and an auxiliary valve for controlling the admission of controlling pressure to the control chamber of the pressure regulating valve.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

BRIEF DESCRIPTION OF THE DRAWING

One preferred form of the invention will now be described with reference to the accompanying drawings wherein:

FIG. 1 is a cross-sectional view of a main pressure regulating valve according to the invention;

FIG. 2 is a cross-sectional view of an auxiliary valve according to the invention;

FIG. 3 is a diagram showing the interconnection of the auxiliary and main valves in a vacuum system, e.g. a milking installation; and FIG. 4 is a cross-sectional view of a pressure relief valve which may be used in the valve of FIG. 1 if desired.

DETAILED DESCRIPTION

Referring to the drawings the invention will be described with reference to a main valve and an auxiliary valve used in a milking installation to maintain the pressure in that installation at a substantially constant level. However, it will be appreciated that a valve of the type described could be used in applications other than milking installations.

Referring firstly to FIG. 1, a main valve is provided comprising main body member 1 having spaced flanges 4 and 5 to provide mounting surfaces for movable walls in the form of flexible diaphragms 6 and 7. Diaphragms 6 and 7 are clamped to body member 1 by cover 8 and inlet section 9, respectively, by means of screws 16. A cylindrical wall 10 linking flanges 4 and 5 in combination with diaphragms 6 and 7 defines chamber 11 which communicates with tube 2 through outlet port 3.

Cover 8 and diaphragm 6 define or form an enclosed control chamber 12. Nipple 14 having port 13 extends from chamber 12 for purposes hereinafter described and an air bleed orifice 15 leads from chamber 12 to atmosphere.

The flexible diaphragm 6 is bonded to a rigid reinforcing plate 17 which may be of metal or a suitable plastics material and in a like manner flexible diaphragm 7 is bonded to reinforcing plate 18.

Diaphragm 7 acts as a valve member and as can be seen diaphragm assembly 7 with attached plate 18 has a central aperture 19 therein. The wall or edge of aperture 19 coacts with a valve seat formed by surface 20 on inlet section 9 to form an air inlet valve from a pressure source which, in this case, is atmosphere. The surface 20 may be conical as shown or planar (flat) as the application or construction may require.

Inlet section 9 also includes conical surfaces 21 and 22 which direct air from inlet ports 23 towards the valving point between diaphragm 7 and valve seating surface 20.

It will be noted that the diaphragm assemblies 6, 17 and 7, 18 are rigidly coupled together by a plurality of, preferably three, columns 24. Bolts 25 passing through each column 24 and nuts 26 fix the columns to the diaphragms. Alternatively, columns 24 could be moulded on to either or both of the reinforcing members 17 and 18 or joined to the reinforcing members by screws, rivets, adhesive means or any other suitable means.

Referring now to FIG. 2, an auxiliary valve assembly is also provided comrpising a lower body section 27 and upper body section 28 fastened together by screws (not shown) or the like to provide a leakproof joint therebetween. In addition a gasket (not shown) or other form of sealing means may be used.

A circular chamber 30 is formed in lower body section 27. Valve seat 29 is formed in the lower wall of chamber 30 and defines the entrance to port 36 provided in nipple 37. In use, a connection is made between nipple 37 and nipple 14 (FIG. 1) of the main valve as will be described hereinafter. Chamber 30 also includes port 31 in a nipple 32 which connects chamber 30 to pilot connection 34 on air line 35 by means of tube 33 (FIG. 3).

A valve member 38 coacts with valve seat 29. As can be seen, valve member 38 is formed as an extension of shaft 39 which is supported from the centers of flexible diaphragms 40 and 41. Diaphragms 40 and 41 are separated by spacer 42 and clamped to shaft 39 by means of nut 43 and washer 44. A collar 45 on top of diaphragm 40 and beneath washer 44 is adapted to receive the lower end of a control spring 46. The upper end of spring 46 is located by a bushing which, in turn, is displaced axially by adjusting screw 48 to compress the spring. Screw 48 is threaded into an extension 49 of upper body section 28. A cap 50 may be used to cover and/or seal the screwed opening 51 in extension 49.

It will be noted that body section 28 defines or includes a circular chamber 53 above diaphragm 40 which is connected to chamber 30 by conduit 52. Conduit 54 connects chamber 55 between diaphragms 40 and 41 to atmosphere.

In operation, the main and auxiliary valves are connected as in FIG. 3 in which pipe 35 is part of the system in which the "vacuum" (negative pressure) level is to be controlled, e.g. a milking machine system.

The pressure at any instant in pipe 35 is transmitted by means of tube 33 and port 31 to chamber 30 and by means of conduit 52 to chamber 53. If the pressure in pipe 35 is lower than that present in chambers 30 and 53, air will be evacuated until an equivalent pressure level is attained.

It will be noted from FIG. 2 that the area of diaphragm 40 exposed to chamber 53 is greater than the area of diaphragm 41 exposed to chamber 30. Since chamber 55 between diaphragms 40 and 41 is always at atmospheric pressure because of conduit 54 any application of vacuum to port 31 will result in upward force being applied to the diaphragm set and mounting shaft 39, i.e. towards chamber 53 which will tend to lift valve 38 away from valve seat 29. When this upward force is sufficient to overcome the force applied by spring 46, valve 38 will move away from valve seat 29 so that chamber 12 (FIG. 1) will be evacuated by the negative pressure present at port 31.

It will be appreciated that providing the evacuation rate from chamber 12 is greater than the rate at which air under atmospheric pressure can bleed into chamber 12 (FIG. 1) via orifice 15, the pressure in chamber 12 will be lowered (vacuum level raised).

In the embodiment depicted and herein described diaphragms 5 and 7 are of the same external diameter but as diaphragm 7 has valve orifice 19 therethrough diaphragm 6 has a greater active area exposed to the pressure level present in chamber 11 than does diaphragm 7.

When the vacuum pump (not shown) connected to pipe 35 (FIG. 3) is running, chamber 11 will be evacuated to the same level as will the interior of pipe 35 (and the system to be controlled).

With the valve member 38 in the auxiliary valve closed against seat 29, air will be bled through orifice 15 as is needed to maintain the pressure in chamber 12 at atmospheric level. The lower surface of diaphragm 7 is also exposed to atmospheric pressure through ports 23.

When the pressure in regulated pressure chamber 11 (system pressure) is reduced to less than atmospheric pressure there will be a resultant inwards force exerted by the greater active area of diaphragm 6 over diaphragm 7, such resultant force pressing the orifice 19 in diaphragm 7 against valve surface 20. Under this condition air is not able to pass from inlets 23, between diaphragm 7 and surface 20, and into chamber 11.

However, when the valve member 38 is lifted away from seat 29 to allow evacuation of chamber 12 as previously described, atmospheric pressure acting on the lower annular surface of diaphragm 7 will lift the diaphragm assembly away from valve surface 20 so that air may pass from inlet ports 23, between diaphragm 7 and valve surface 20, through orifice 19 to chamber 11. From the chamber 11, the air passes into pipe 35 and the system to be controlled.

As a result of this air admission the pressure in pipe 35 and the system will rise (the vacuum level will be lowered) and this changed or raised system pressure will be transmitted to chambers 30 and 53 in the auxiliary valve assembly. This increase in pressure will act on diaphragm 40 and diaphgram 41 to reduce the resultant force which is tending to lift valve 38 away from seat 29 and when the force is lower than that exerted by control spring 46, valve 38 will move back towards seat 29 restricting air flow through port 36 and allowing air bleeding in through orifice 15 to raise the pressure in chamber 12. This in turn will cause the diaphragm assembly to move away from cover 8 and to restrict the valve orifice between diaphragm 7 and valve surface 20.

In practice the pressure on control spring 46 will be adjusted by means of screw 48 so that the required negative pressure (vacuum) level may be maintained in pipe 35 and the system.

Since "vacuum" demands in a system such as a milking installation generally tend to remain reasonably steady, the auxiliary valve and the main valve will tend to adopt positions at which just enough air is admitted to the system to maintain the system pressure at the required level, the respective valve positions only changing when the equilibrium is upset by a change in system pressure.

The vacuum regulator described herein has inherent safety features in that should either diaphragm 6 or diaphragm 7 rupture or perforate, this will not result in a severe increase in "vacuum level" or reduction in pressure in the system under control, which could cause animal discomfort should the system be a milking installation.

If diaphragm 7 should perforate, admission of air through ports 23 and the perforation would result in an increase in system pressure or reduction in "vacuum" level.

If diaphragm 6 should perforate air would flow from cavity 12 through the perforation into chamber 11. With the pressure in chamber 11 reduced, atmospheric pressure acting on the underside of diaphragm 7 would force diaphragm 7 away from valve surface 20 to admit air to chamber 11, lowering the "vacuum" or increasing the pressure therein.

With a regulator as heretofore described, if the pilot line 33 is broken or disconnected, there will be no means of reducing the pressure level in chamber 12 (FIG. 1) and the diaphragm 7 will remain firmly pressed against valve surface 20 by the atmospheric pressure in chamber 12. As a result system pressure will be reduced (vacuum increased) up to the limits of the pump capacity balanced against system demands. This increase in vacuum could result in discomfort to animals being milked.

For this reason an over-riding safety valve is preferably provided to prevent excessive "vacuum level" increases. The safety valve can, if desired, be arranged to operate a suitable alarm to draw the operator's attention to the fault.

A suitable safety valve is described in FIG. 4. This incorporates several of the features of earlier vacuum regulators made under New Zealand patent No. 161050. Such a valve may be mounted in the wall of port 2 (FIG. 1) or pipe 35 (FIG. 3) or preferably as shown in FIG. 4, in the center of valve surface 20 of inlet section 9 (FIG. 1).

In the form shown, a tubular extension 56 is mounted on or formed integrally with the lower side of section 9 and, in turn, defines or includes valve seat 7, tubular spring retainer 58 and valve guide 59.

A conical valve 64 is provided which coacts with valve seat 57. Valve stem 60 extends from the underside of valve 64 and is threaded at its outer end 61 to receive adjustable collar 62 which is used to compress valve spring 63. A curved reaction surface 65 is formed underneath the wide head 66 on valve 64, the head 66 being a close fit inside circular recess 67 provided in extension 56. Air inlets 68 admit atmospheric air to chamber 69 below valve seat 57.

In operation the system "vacuum" (negative pressure) acts on the surfaces of valve 64 above valve seat 57. Atmospheric pressure acts on the area of valve 64 below seat 57. When the force resulting from this resultant pressure differential acting on the area of valve 64 above seat 57 is great enough to overcome the force applied by spring 63, valve 64 will be moved away from seat 57 allowing air to pass from inlets 68, between valve 64 and seat 57 to raise the pressure level in chamber 71 below reaction curve 65. The area offered to the increased pressure level by the greater diameter valve head 66, will result in a much greater force to move valve 64 well away from seat 57 and lower edge 70 of valve head 66 clear of valve surface 20. The resulting increased air flow through ports 68, through the widened gap between valve 64 and seat 57, through chamber 67 and through the gap between rim 70 and surface 20 is deflected back towards surface 20 by reaction curve 65. This further increases the lifting or opening force on valve 64 so valve 64 is held firmly in the open position and will remain so even when the pressure level rises in chamber 12 (vacuum level falls). The open position is maintained until a point is reached where the resultant of all the forces exerted on valve 64 and valve head 66 is less than the original force required to lift valve 64 away from seat 57 against the force exerted by spring 63.

Although not shown in the drawings, some type of alarm could be provided to indicate when the pressure relief valve is operating. The alarm could be situated at a remote point and activated by a switch tripped by movement of the valve 64. As a further alternative a whistle could be provided in communication with air inlets 68 to give an audible warning when air passes through the apertures 68.

In practice it would be likely that the vacuum pump would be able to hold the system vacuum to a level which would hold valve 64 open but which would be below the level at which the vacuum regulator was set to control and below a level at which discomfort would be experienced by the animals being milked.

It will be seen that by the foregoing construction at least in the preferred form a simple main valve is provided which if desired could be controlled directly from the pressure in the vessel in which the pressure is to be controlled e.g. the milk line of the milking installation, but which is preferably controlled by an auxiliary valve which again at least in the preferred form is a relatively simple valve but which gives adequate control.

We claim:

1. A pressure regulating system comprising:
   a main valve comprising,
      a pressure regulating valve having a regulating valve body with a control chamber and a regulated pressure chamber therein,
      a first movable wall within said body separating said control chamber from said regulated pressure chamber,
      a second movable wall spaced from said first movable wall,
      said regulated pressure chamber being disposed between said movable walls,
      column means interconnecting and displaceable with said first and second movable walls so that movement of one wall results in movement of the other wall, and
      valving means operable upon movement of said second movable wall to control a pressure control fluid admission from a pressure source into said regulated pressure chamber comprising an aperture in said second movable wall and a regulating valve member fixed with respect to said regulating valve body;
   an auxiliary valve operatively connected to said main valve comprising;
      an auxiliary valve body having third and fourth movable walls therein dividing said auxiliary valve body into three chambers comprising an outer spring chamber, a central chamber and an outer valved chamber, said spring chamber and said valved chamber being separated by said central chamber, said third movable wall which separates the spring chamber from the central chamber being of larger operative area than said fourth movable wall separating said central chamber from said valved chamber,
      means interconnecting said third and fourth movable walls,
      an auxiliary valve member in said valved chamber movable with said walls,
      a passageway for communicating said valved chamber with said control chamber,
      an auxiliary valve seat in said valved chamber surrounding said passageway and engageable by said auxiliary valve member,
      a spring in said spring chamber operatively engaging said auxiliary valve member for urging said auxiliary valve member into a closed position in engagement with said auxiliary valve seat, and
      means for communicating said central chamber with the ambient atmosphere;
   means for communicating said spring chamber and said valved chamber with said regulated pressure chamber of said pressure regulating valve,
   so that upon reduction of pressure in said outer chambers to a desired pressure said auxiliary valve will be opened causing transmission of said reduced pressure to said control chamber of said pressure regulating valve, and variations in the pressure in said regulating pressure chamber are transmitted to said spring chamber and said valved chamber causing movement of said third and fourth movable walls varying the position of said auxiliary valve to vary the pressure in said control chamber to cause movement of said first and second movable walls thereby actuating said valving means to control the admission of fluid from said pressure source to said regulated pressure chamber for controlling the pressure in said regulated pressure chamber; and
   a pressure relief valve having a valve seat in a port through said fixed regulatng valve member,
   a relief valve member engageable with said relief valve seat exposed to the regulated pressure chamber on one surface thereof and exposed to atmospheric pressure on another surface thereof when in an open position, and a spring means operatively engaged with said relief valve member to bias said relief valve member towards the closed position in engagement with said relief valve, the construction and arrangement being such that a reduction in pressure in said regulated pressure chamber below a predetermined level causes said relief valve member to lift off said relief valve seat thereby admitting atmospheric air to said regulated pressure chamber.

2. A pressure regulating system as claimed in claim 1 wherein said movable walls of said pressure regulating valve are parallel.

3. A pressure regulating system as claimed in claim 1 wherein said movable walls of said pressure regulating valve each comprises a diaphragm.

4. A pressure regulating system as claimed in claim 1 wherein said regulating valve member is formed in said body.

5. A pressure regulating system as claimed in claim 1 wherein said relief valve member has a reaction surface on the underside thereof opposite to said one surface constructed and arranged to cause admitting air to be deflected in a direction such that said admitted air maintains said relief valve member in the open position once said relief valve has been opened.

6. A pressure regulating system as claimed in claim 1 wherein said pressure relief valve is mounted within said regulating valve member, the relief valve member of said pressure relief valve opening into said regulated pressure chamber.

7. The pressure regulating system as claimed in claim 1 wherein said movable walls of said auxillary valve comprise diaphragms.

* * * * *